Patented Jan. 13, 1931

1,788,860

UNITED STATES PATENT OFFICE

ALBERT M. CLIFFORD, OF AKRON, OHIO, ASSIGNOR TO THE GOODYEAR TIRE & RUBBER COMPANY, OF AKRON, OHIO, A CORPORATION OF OHIO

ANTIOXIDANT OR AGE RETARDER

No Drawing.   Application filed December 10, 1927.   Serial No. 239,261.

My invention relates to the treatment of rubber or rubber-like materials and it has particular relation to a method of preserving rubber from the deteriorating effects of aging or oxidation.

More specifically, my invention has for one of its objects the provision of a material which, when incorporated in rubber, serves to inhibit oxidation and decay of the rubber.

Another object of the invention consists in the provision of an antioxidant or age-retarder that is composed of a substituted aromatic hydroxy compound.

It has been observed heretofore that certain aromatic hydroxy compounds, for example $\alpha$-naphthol or hydroquinone, when incorporated into a rubber compound, act as preservatives or age-retarders for that material.

This invention consists in the discovery that substituted aromatic hydroxy materials may also serve as antioxidants when incorporated into rubber. A specific example of a material which falls within the scope of the invention is $\alpha$-chlor $\beta$-naphthol, whose structural formula may be represented as follows:

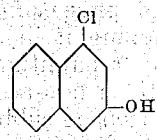

This material may be prepared by the following method. Dissolve one part of $\beta$-naphthol in about eight parts of glacial acetic acid. This solution is then placed in a cooling bath and is treated with a molecular quantity of chlorine. The chlorinated material is then treated with an excess of a saturated stannic chloride solution and $\alpha$-chlor $\beta$-naphthol first precipitates as an oil which soon crystallizes. The crystalline material may be dissolved and recrystallized from ligroin white. The purified material has a melting point of 70° C.

Another material of this general class is $\alpha$-amino $\beta$-naphthol, which is obtained by reducing $\alpha$-nitroso $\beta$-naphthol with sodium hydrosulphide in an aqueous alcoholic solution. The reaction product ($\alpha$-amino $\beta$-naphthol) is precipitated from the solution upon warming after the addition of common salt. The yield is approximately 75 percent of that theoretically possible.

The materials discussed may of course be incorporated into various rubber compounds with satisfactory results. The following formula may be employed to obtain an excellent quality of product when any of the amines previously discussed are incorporated therein as antioxidants or age-resisters:

|  | Parts |
|---|---|
| Extracted rubber | 100 |
| Zinc oxide | 5 |
| Sulphur | 3 |
| Stearic acid | 1.5 |
| Hexamethylene tetramine | 1 |
| Antioxidant | 1 |

Samples of material prepared in accordance with the preceding formula, in which $\alpha$-chlor $\beta$-naphthol and $\alpha$-amino $\beta$-naphthol were employed as antioxidants, were subjected to cures conducted for different periods of time at a temperature corresponding to forty pounds of steam pressure. Certain of the samples were then immediately subjected to tests in order to ascertain the elasticity and tensile strength thereof. Other samples were placed in an oxygen bomb and subjected to an air pressure of 50 pounds per square inch at a temperature of 50° C. for a period of 6 days. The latter samples were weighed before and after the aging test in order to ascertain the percent absorption of oxygen taking place during the test. The samples were also subjected to tests similar to those conducted with reference to the samples that were tested immediately without artificial aging. The following tables contain the results obtained from these tests:

1-chlor 2-naphthol

ORIGINAL

| Time of cure mins. at 40# | Kgs/cm² tensile strength | Per cent elongation | Load in 500% elongation | Kgs/cm² at 700% elongation | % wt. increase after 6 days at 50° C. |
|---|---|---|---|---|---|
| 30 | 115 | 905 | 13 | 39 | ---------- |
| 50 | 170 | 845 | 19 | 66 | ---------- |
| 70 | 160 | 810 | 22 | 83 | ---------- |

AFTER AGING

| 30 | 55 | 825 | 12 | 28 | .6 |
| 50 | 85 | 760 | 18 | 59 | .7 |
| 70 | 90 | 700 | 28 | 90 | 1.1 |

α-amino β-naphthol

ORIGINAL

| 30 | 95 | 810 | 16 | 50 | ---------- |
| 50 | 168 | 820 | 23 | 84 | ---------- |
| 70 | 188 | 765 | 33 | 130 | ---------- |

AGED

| 30 | 108 | 800 | 18 | 60 | .13 |
| 50 | 138 | 775 | 24 | 90 | .17 |
| 70 | 148 | 710 | 38 | 142 | .58 |

It will be observed from the tables that both antioxidants to a large extent inhibit the absorption of oxygen by the rubber compounds into which they are incorporated and that the samples are of satisfactory tensile strength and elasticity even after having been subjected to the action of oxygen at a relatively high temperature for a period of six days. Samples of rubber prepared in accordance with the preceding formula, but in which no antioxidant is used, are reduced to resinous masses by such treatment.

Although I have described in detail only the preferred embodiments of my invention, it will be apparent to those skilled in the art that it is not so limited, but that various minor modifications may be made therein without departing from the spirit of the invention or from the scope of the appended claims.

What I claim is:

1. A method of preserving rubber which comprises incorporating therein a material having the following structural formula:

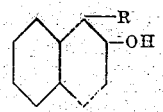

in which R is an amine group.

2. A rubber product that has been vulcanized in the presence of a material having the following structural formula:

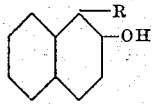

in which R is either an amine or a chlorine group, said material being substantially a non-accelerator.

3. A vulcanized rubber product that has been prepared in the presence of a material having the following structural formula:

in which R is an amine group, said material being substantially a non-accelerator.

4. A rubber product that has been vulcanized in the presence of α-amino β-naphthol.

5. A method of preserving rubber which comprises vulcanizing it in the presence of a material having the following structural formula:

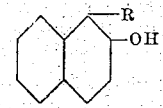

in which R is either a basic nitrogen containing or a chlorine group.

6. A method of preserving rubber which comprises vulcanizing it in the presence of a material having the following structural formula:

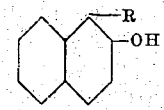

in which R is either an amino group or a chlorine atom.

7. A method of preserving rubber which comprises vulcanizing it in the presence of alpha-amino beta-naphthol.

8. A method of preserving rubber which comprises vulcanizing it in the presence of an alpha-amino beta-naphthol, said material being substantially a non-accelerator of the rate of vulcanization of rubber.

9. A rubber product that has been vulcanized in the presence of an alpha-amino beta-naphthol, said material being substantially a non-accelerator of the rate of vulcanization.

10. A method of preserving rubber which comprises subjecting it to vulcanization in the presence of alpha-chlor-beta-naphthol.

In witness whereof, I have hereunto signed my name.

Signed at Akron, in the county of Summit, and State of Ohio, this 9th day of December, 1927.

ALBERT M. CLIFFORD.